United States Patent
Tseng et al.

(10) Patent No.: US 6,799,179 B2
(45) Date of Patent: Sep. 28, 2004

(54) GLOBALLY-INTEGRATED RETURNED MATERIAL AUTHORIZATION INFORMATION SYSTEM

(75) Inventors: Li-Ching Tseng, Taipei (TW); Yi-Ming Liao, Taipei (TW); Cheng-Ju Chen, Taipei (TW)

(73) Assignee: Inventec Corporation, Taipei (TW)

( * ) Notice: Subject to any disclaimer, the term of this patent is extended or adjusted under 35 U.S.C. 154(b) by 334 days.

(21) Appl. No.: 09/996,960

(22) Filed: Nov. 30, 2001

(65) Prior Publication Data

US 2003/0105766 A1 Jun. 5, 2003

(51) Int. Cl.$^7$ .............................................. G06F 17/30
(52) U.S. Cl. .................. 707/10; 707/200; 707/201; 707/203; 707/205
(58) Field of Search ........................ 707/200, 10, 201, 707/203, 205; 705/35; 701/29; 709/224

(56) References Cited

U.S. PATENT DOCUMENTS 6,226,623 B1 * 5/2001 Schein et al. ................. 705/35
6,389,337 B1 * 5/2002 Kolls ........................... 701/29

OTHER PUBLICATIONS

Terada, "Communication apparatus, server, service center, and service method", May 2002, US patent application Publication, pp. 1–10.*

Lee et al., "Method, System, and Program for Customer Service and Support Management", OCt. 2002, US patent application Publication, pp. 1–10.*

Spira et al., "Menu Driven Management and Operation Technique", Sep. 2003, US patent application Publication, pp. 1–32.*

Edmonds et al., "System and related methods for remote production line monitoring using the web", US patent application Publication, pp. 1–8.*

* cited by examiner

*Primary Examiner*—Thuy N Pardo
(74) *Attorney, Agent, or Firm*—Rothwell, Figg, Ernst & Manbeck

(57) ABSTRACT

A globally-integrated RMA (Returned Material Authorization) information system is proposed, which allows the RMA files built at a first global location, such as an oversees service station, to be shared by personnel at a second global location, such as a domestic repair center. The service station information system is capable of transferring RMS files periodically at specified time intervals to the repair center information system, so that when the domestic repair center receives a batch of returned products from the oversees service station, the repair personnel can immediately gain access to the associated RMS files of the returned products, without having to repeat a testing procedure and build RMS files for the returned products. The proposed globally-integrated RMA information system therefore allows the overall after-sale repair service to be more efficient and reliable.

8 Claims, 2 Drawing Sheets

GLOBALLY-INTEGRATED RETURNED MATERIAL AUTHORIZATION INFORMATION SYSTEM

BACKGROUND OF THE INVENTION

1. Field of the Invention

This invention relates to information technology, and more particularly, to a globally-integrated RMA (Returned Material Authorization) information system, which allows the RMA files built at a first global location, such as an oversees service station, to be shared by personnel at a second global location, such as a domestic repair center.

2. Description of Related Art

Globally-oriented corporations that sell products around the world often establish oversees service stations in foreign countries where their products are being sold so as to offer after-sale repair services to the oversees customers. If a sold product is defective, the customer can return the product to any nearby service station for repair. As a standard procedure, the service station will first build a so-called RMA (Returned Material Authorization) file which contains all the information about the returned product that can be referenced to perform the required repair work. If the repair work is minor, the service station may fix the problem by its own personnel; otherwise, the oversees service station will send the returned product back to its domestic repair center.

Presently, however, since the domestic repair center is unable to immediately gain access to the RMS files built by oversees service stations, it often requires the domestic repair center to repeat the testing procedure on the returned products transported back from the oversees service station to thereby build a new RMS file for each returned product. In regard to the corporation's overall service operation, this repeated task would be undoubtedly quite wasting in time and manpower, making the overall after-sale repair service quite inefficient and cost-ineffective. Moreover, since the RMS files built by the domestic personnel may be inconsistent with those built by the oversees personnel, it would cause serious management problems to the after-sale repair service. It also makes the domestic personnel unable to effectively track every returned product from the oversees service station. All these problems would make the overall after-sale repair service quite inefficient.

SUMMARY OF THE INVENTION

It is therefore an objective of this invention to provide a globally-integrated RMA information system which allows an oversees service station to transfer RMS files periodically back to a domestic repair center, so that when the domestic repair center receives a batch of returned products from the oversees service station, the domestic repair personnel can immediately gain access to the associated RMS files of the returned products and thereby allow the after-sale repair service to be more efficient to carry out.

In accordance with the foregoing and other objectives, the invention proposes a globally-integrated RMA information system.

The globally-integrated RMA information system of the invention comprises a repair center information system installed at a first global location, a service station information system installed at a second global location, and data communication link installed between the repair center information system and the service station information system to allow the repair center information system and the service station information system to exchange data. The service station information system is capable of transferring all the RMS files periodically at specified time intervals back to the repair center information system. When the domestic repair center receives a batch of returned products from the oversees service station, the repair personnel can immediately gain access to the associated RMS files of the returned products from the local RMA database of the repair center information system, without having to repeat a testing procedure and build a RMS file for each returned product transported back from the oversees service station. The globally-integrated RMA information system of the invention therefore allows the overall after-sale repair service to be more efficient and reliable.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The globally-integrated RMA information system according to the invention is disclosed in full details by way of preferred embodiments in the following with reference to FIG. 1 and FIG. 2.

Figure 1:
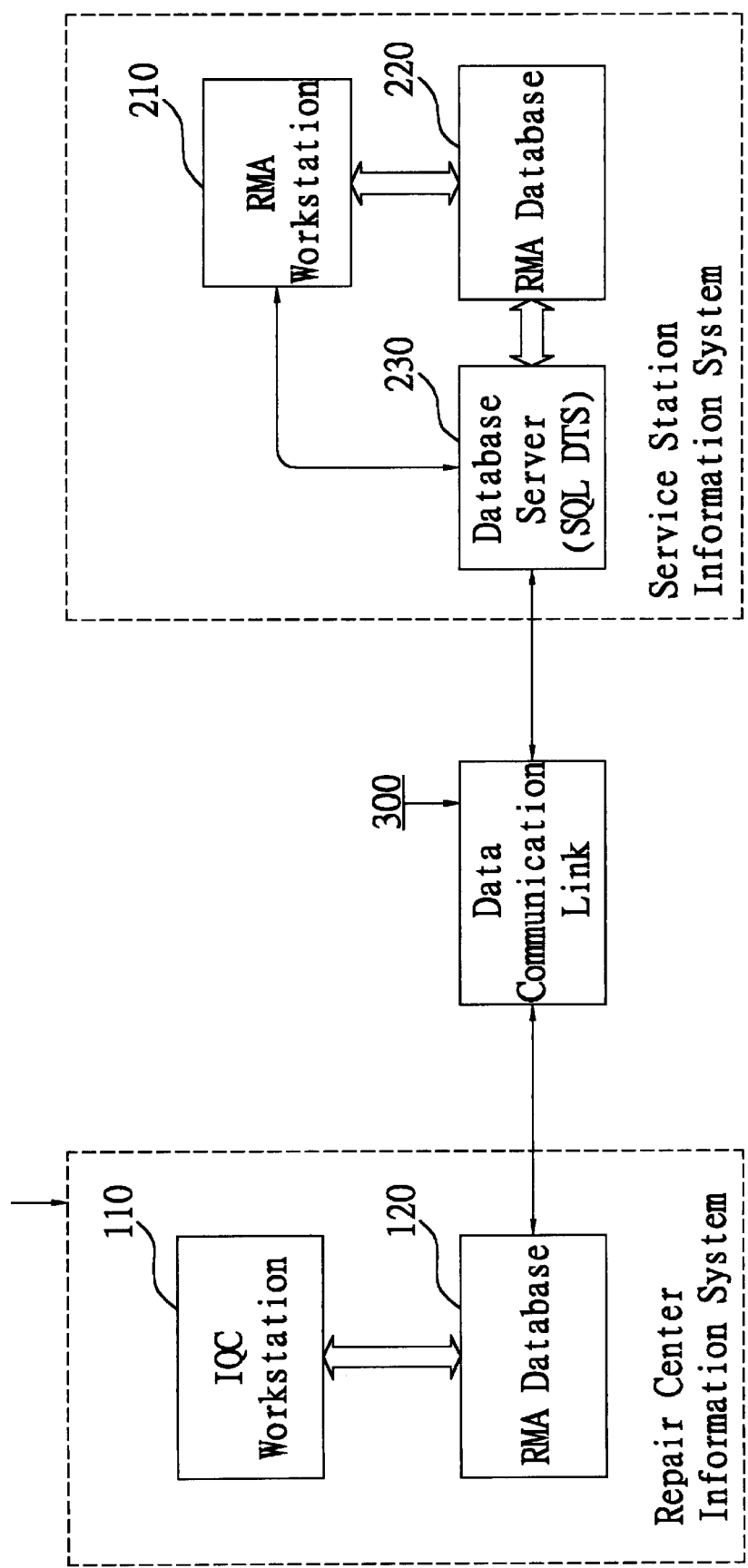
FIG. 1 is a schematic diagram showing the system architecture of the globally-integrated RMA information system according to the invention.

FIG. 1 is a schematic diagram showing the system architecture of the globally-integrated RMA information system according to the invention. As shown, the globally-integrated RMA information system of the invention comprises: (a) a repair center information system 100, such as a mainframe, which is installed at a first global location, such as Taipei, Taiwan; (b) a service station information system 200, such as a small business computer, which is installed at a second global location, such as California, USA; and (c) a data communication link 300, such as an Internet link or a directly-linked data communication line, which is installed between the repair center information system 100 and the service station information system 200 to allow these two information systems 100, 200 to exchange data.

The repair center information system 100 includes: (a1) an IQC (Incoming Quality Control) workstation 110; and (a2) an RMA database 120. The IQC workstation 110 allows repair personnel at the repair center to operate the repair center information system 100 and gain access to the RMA database 120 which is used to receive and store all the RMA files that are transferred from the service station information system 200 via the data communication link 300.

The service station information system 200 includes: (b1) an RMA workstation 210; (b2) an RMA database 220; and (b3) a database server 230. The RMA workstation 210 allows service personnel at the service station to input and built an RMA file for each returned product, and in this procedure, the unique service tag of each returned product is used as the identification number of the RMA file. All the RMA files that are built on the RMA workstation 210 are then stored in the RMA database 220. The database server 230 can be, for example, an SQL (Structured Query Language) server, which can utilize SQL's DTS (Data Transformation Services) and schedule task to automatically transfer all the RMS files in the RMA database 220 periodically at preset intervals of time, for example once in a day or once in a week, via the data communication link 300 to the RMA database 120 in the repair center information system 100.

Figure 2:
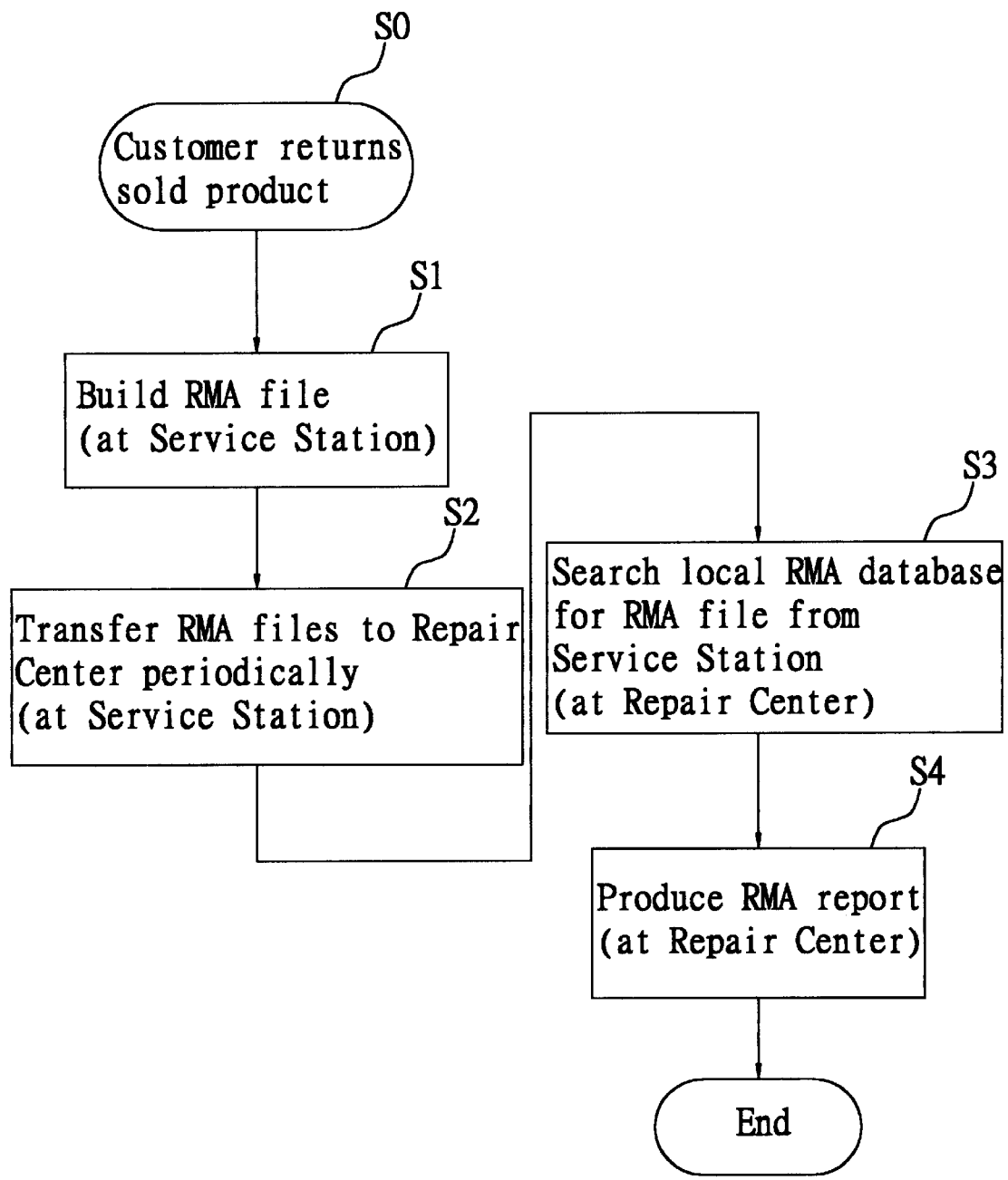
FIG. 2 is a flow diagram showing the operational steps of the globally-integrated RMA information system according to the invention.

FIG. 2 is a flow diagram showing the operational steps of the globally-integrated RMA information system according to the invention.

At the initial step S0, the overseas service station receives a returned product, such as a notebook computer, from a customer. The step S1 is then executed, in which the service personal uses the RMA workstation 210 to build an RMS file for the returned product and use the service tag of the returned product as an identification number for the RMS file. The RMS file is then stored into the RMA database 220.

Next, at the step S2, all the RMS files stored in the RMA database 220 are transferred periodically at preset intervals of time, such as once in a day or once in a week, by the database server 230 through SQL's DTS and scheduled task via the data communication link 300 to the RMA database 120 of the repair center information system 100.

Next, at the step S3, when the repair center receives a batch of returned products transported back from the oversees service station, the repair personnel can immediately use the IQC workstation 110 to gain access to the RMA database 120 and use the service tags of the returned products as search keys to retrieve the associated RMS files of the returned products, which have been previously transferred back from the service station information system 200 via the data communication link 300.

Next, at the step S4, the repair personal then inspect the returned products with the RMS files to thereby produce an RMS report for the returned products to be used in the repair procedure.

In conclusion, the invention provides a globally-integrated RMA information system, which is characterized in that it allows an oversees service station to transfer RMS files periodically back to a domestic repair center, so that when the domestic repair center receives a batch of returned products from the oversees service station, the repair personnel can immediately gain access to the associated RMS files of the returned products, without having to repeat a testing procedure and build RMS files for the returned products. The globally-integrated RMA information system of the invention therefore allows the overall after-sale repair service to be more efficient and reliable.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A globally-integrated Return Material Authorization (RMA) information system, which comprises:
   (a) a repair center information system installed at a first global location;
   (b) a service station information system installed at a second global location; and
   (c) a data communication link installed between the repair center information system and the service station information system to allow the repair center information system and the service station information system to exchange data;
   wherein
   the repair center information system includes:
   (a1) an incoming quality control (IQC) workstation, which allows repair personnel to operate the repair center information system; and
   (a2) a first RMA database, which is used to store RMA files that are transferred from the service station information system via the data communication link, and which can be accessed via the IQC workstation;
   and wherein
   the service station information system includes:
   (b1) a RMA workstation, which allows service personnel to input and build an RMA file for each returned product;
   (b2) a second RMA database, which is used to store every RMA file built via the RMA workstation; and
   (b3) a database server having data transforming services (DTS) and schedule task for transferring all the RMA files stored in the second RMA database via the data communication link to the first RMA database at specified time intervals.

2. The globally-integrated RMA information system of claim 1, wherein the service tag of each returned product is used as an identification number for the RMA file of the returned product.

3. The globally-integrated RMA information system of claim 1, wherein the database server of the service station information system is a structured query language (SQL) server.

4. The globally-integrated RMA information system of claim 1, wherein the data communication link is an Internet link.

5. The globally-integrated RMA information system of claim 1, wherein the data communication link is a directly-linked data communication line.

6. A globally-integrated Return Material Authorization (RMA) information system, which comprises:
   (a) a repair center information system installed at a first global location;
   (b) a service station information system installed at a second global location; and
   (c) a data communication link installed between the repair center information system and the service station information system to allow the repair center information system and the service station information system to exchange data;
   wherein
   the repair center information system includes:
   (a1) an incoming quality control (IQC) workstation, which allows repair personnel to operate the repair center information system; and
   (a2) a first RMA database, which is used to stored RMA files that are transferred from the service station information system via the data communication link, and which can be access via the IQC workstation;
   and wherein
   the service station information system includes:
   (b1) a RMA workstation, which allows service personnel to input and built an RMA file for each returned product, wherein the service tag of each returned product is used as an identification number for the RMA file of the returned product;

(b2) a second RMA database, which is used to store every RMA file built via the RMA workstation; and (b3) a structured query language (SQL) server, which is capable of transferring all the RMA files stored in the second RMA database via the data communication link to the first RMA database at preset time intervals by utilizing a data transforming services (DTS) and schedule task of the SQL server.

7. The globally-integrated RMA information system of claim 6, wherein the data communication link is an Internet link.

8. The globally-integrated RMA information system of claim 6, wherein the data communication link is a directly-linked data communication line.

* * * * *